Feb. 6, 1962     F. W. JOHNSON     3,020,507
UNIFORM TROLLEY LOADING IN A COIL
Filed Oct. 21, 1960
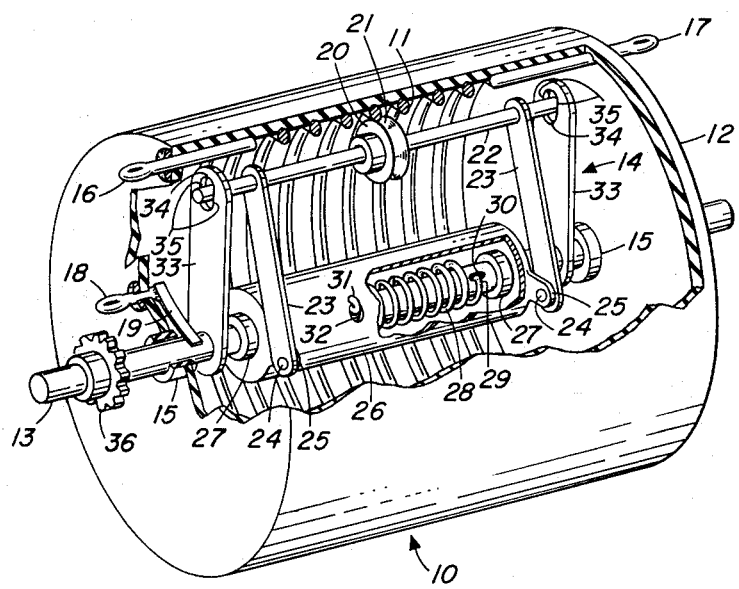
INVENTOR.
FREDERICK W. JOHNSON
BY
ATTORNEYS 3,020,507
UNIFORM TROLLEY LOADING IN A COIL
Frederick W. Johnson, Cedar Rapids, Iowa, assignor to Collins Radio Company, Cedar Rapids, Iowa, a corporation of Iowa
Filed Oct. 21, 1960, Ser. No. 64,056
5 Claims. (Cl. 338—143)

This invention relates to helix coil trolleys and is particularly concerned with trolley loading apparatus designed for uniform trolley loading throughout the range of trolley travel in a coil.

Various mechanical systems have been developed for loading the trolley of a coil which, while providing workable devices, do not completely answer operating problems presented. When a coil is used in a servo driven system improvements in uniformity of torque required to drive the coil trolley are reflected in improved system stability, increased speed of response, improved accuracy or decreased cost and less complexity. With uniform torque the system can be optimized for fixed values of friction and inertia. However, with coil mechanisms the servo system load varies as the trolley contact pressure varies. This necessitates optimizing the sytem for either the maximum or minimum load or some intermediate load point.

Some coils feature a trolley arrangement wherein a trolley wheel is rotatably and slidably mounted on a shaft upon which dual independent springs act to press the trolley wheel against the coil. However, since the springs are widely separated the force exerted through the trolley wheel may vary from a maximum when the wheel is midway between the leaf springs to a minimum little more than one-half the maximum when the trolley wheel is in the immediate region of one of the springs. With such force variance electrical contact impedance between the roller and the coil will vary. With some arrangements a trolley contact is directly spring biased into the coil. However, since it is impossible to so wind and so mount a space-wound coil that there is no eccentric movement between the coil and the axis of relative rotation between the coil and the trolley contact, interrelated problems of space limitations and spring rate are important. The trolley contact loading varies with direct compression of the biasing spring.

It is, therefore, a principal object of this invention to provide substantially uniform trolley pressure on the helical trackway of a helix wound space coil.

Another object is to minimize coil trolley sliding friction and system inertia.

Features in the accomplishment of these objects are the provision of a structurally rigid tube rotatably mounted on the main shaft of a coil, and spring torsion means, of substantially constant force and low rate through the range of operative movement, interconnecting the main shaft and the tube. This arrangement also features a trolley wheel rotatably and slidably mounted on a trolley shaft within the coil, dual links rigidly connected to the trolley shaft and pivotally mounted on opposite ends of the tube, and arms rigidly mounted on the main shaft having radially extended slots for slidably guiding radial movement of the trolley shaft as the trolley wheel rolls along the coil.

A specific embodiment representing what is presently regarded as the best mode of carrying out the invention is illustrated in the accompanying drawing.

In the drawing, the FIGURE represents a perspective view of a coil partially broken away to illustrate trolley loading apparatus details.

Referring to the drawing:

Electrical coil 10 is equipped with a helical trackway formed by a helix wound space coil 11 mounted in case 12 which also cooperatively mounts main shaft 13. Coil contact apparatus in the form of trolley 14 is mounted on the main shaft 13, which is held by bearings 15 of case 12, for relative rotation between the coil and the trolley 14 along with the main shaft 13. Electrical connection terminals 16 and 17 for opposite ends of coil 11 extend through case 12 in conventional manner as does the electrical connection terminal 18 for the riding spring 19 which contacts main shaft 13 for the circuit of trolley 14.

Obviously the construction of electrical coil 10 may be employed in a variable inductance device, in which event the electrical circuit would be tied through connection 16 or 17 and connection 18 as the other terminal. When so employed, space coil 11 would preferably have low electrical resistance. The device may also be used as an adjustable resistance (impedance) device with connections as above and with space coil 11 probably being a high resistance element. Then, on the other hand, all three terminals 16, 17 and 18 may be connected in circuit with the coil being an adjustable voltage divider and space coil 11 preferably a high resistance element.

Whatever way electrical coil 10 may be used, and even though an open frame of insulating material may be used for cooperative support between coil 11 and shaft 13 in place of case 12, structural features of trolley 14 will remain substantially the same. Trolley 14 utilizes a trolley wheel 20 having an annular groove 21 to insure continued riding contact with space coil 11. The wheel 20 is also rotatably and slidably mounted on a trolley shaft 22 in order that the wheel 20 will easily follow coil 11 during relative rotation.

Adjacent opposite ends of and spanning the sliding range of trolley wheel 20, consistent with the range of trolley travel along the space coil 11, trolley shaft 22 is rigidly connected to two links 23. These links 23 are conveniently pivotally mounted by pivot pins 24 on end projections 25 of torsion tube 26, which also spans the sliding range of trolley wheel 20. Torsion tube 26 is conveniently mounted for rotative movement on main shaft 13 by bearings 27 and is torsionally biased by spring 28. This spring 28 has an end 29 anchored in opening 30 of main shaft 13 and has the other end 31 fastened through opening 32 of torsion tube 26. It is a spring so designed and chosen, such as spring 28 having a number of turns, so as to present a substantially constant low rate torque through the rotative range of movement encountered with torsion tube 26 during operation. In addition, spring 28 is so torsionally loaded when installed as to fall within the optimum low rate torque characteristic operative range.

Links 23 are of such length that pivot pins 24, which are eccentric to the rotational axis of torsion tube, are so located as to substantially optimize the translation of force from torsion tube 26 through links 23 in pressing trolley wheel 20 against space coil 11. This is accomplished with the tube 26 torsionally biased by spring 28 to turn pivot pins 24 in the direction of trolley shaft 22, and with the range of pivot pin 24 movement passing through the region of a plane common to the axis of main shaft 13 and perpendicular to the plane established by the axis of trolley shaft 22 and the axis of main shaft 13. It should be realized that trolley shaft 22 and links 23 are quite rigid, and that the torsion tube 26 along with tube projections 25 is sufficiently rigid to resist any significant torsional deflection. The rigid nature of these components is such that loading of the trolley wheel 20 on the space coil 11 will be substantially the same regardless of the wheels' position on trolley shaft 22 and in wheel travel along the space coil 11.

Arms 33 are fixed to main shaft 13 and are provided with slots 34, having radially extended parallel side edges 35 which slidably retain and guide trolley shaft 22. Thus, trolley shaft 22 and trolley wheel 20 are maintained in fixed rotational relation with the main shaft throughout any relative rotation between space coil 11 and the main shaft 13. At the same time, trolley shaft 22, under loading by torsion tube 26 and spring 28, is free to ride up and down with trolley wheel 20 in adjusting to eccentric spacing between the space coil 11 and the axis of relative rotation between the coil 11 and the trolley 14.

A sprocket wheel or gear 36 is secured to main shaft 13 in order that coil 10 may be suitably mechanically coupled to a servo driving system (not shown). On the other hand, a knob could be mounted in place of gear 36 for manual operation if desired. It should also be understood that trolley wheel 20, trolley shaft 22, links 23, pivot pins 24, torsion tube 26, bearings 27, main shaft 13 and possibly arms 33 will be fabricated of such material and so constructed as to provide a highly conductive electrical path from the point of trolley wheel contact with space coil 11 to and through riding spring 19 and electrical connection 18.

Whereas there is here illustrated and described a preferred construction which I presently regard as the best mode of carrying out my invention, it should be understood that various changes may be made without departing from the disclosed inventive subject matter particularly pointed out and distinctly claimed hereinbelow.

I claim:

1. Apparatus for maintaining substantially uniform trolley pressure on a helical trackway throughout the range of trolley travel along the trackway, comprising a main shaft substantially coaxial with the center axis of said helical trackway, a cooperative support between said main shaft and said trackway, said support being provided with bearing means for relative rotational movement between said main shaft and said trackway, structural means mounted for relative rotative movement about said main shaft, a trolley shaft, a trolley element adapted for following movement along said trackway and adapted for sliding movement along said trolley shaft, linkage means pivotally connected to said structural means and rigidly connected to said trolley shaft, torsion means interconnecting said main shaft and said structural means, said torsion means being adapted for applying substantially constant rate torque to said structural means, said trackway comprising the helix coil electrical element of a variable impedance coil, said cooperative support comprising a housing of insulating material enclosing said variable impedance coil, and arms rigidly mounted on said main shaft for maintaining a fixed rotational relation between said trolley shaft and said main shaft, and said arms being provided with means for guiding radial movement of said trolley shaft relative to said main shaft.

2. Apparatus for maintaining substantially uniform trolley pressure on a helical trackway throughout the range of trolley travel along the trackway, comprising a main shaft substantially coaxial with the center axis of said helical trackway, a cooperative support between said main shaft and said trackway, said support being provided with bearing means for relative rotational movement between said main shaft and said trackway, structural means mounted for relative rotative movement about said main shaft, a trolley shaft, a trolley element adapted for following movement along said trackway and adapted for sliding movement along said trolley shaft, linkage means pivotally connected to said structural means and rigidly connected to said trolley shaft, torsion means interconnecting said main shaft and said structural means, said torsion means being adapted for applying substantially constant rate torque to said structural means, and arms rigidly mounted on said main shaft for maintaining a fixed rotational relation between said trolley shaft and said main shaft, and said arms being each provided with means comprising radially extended parallel slot edges for guiding radial movement of said trolley shaft relative to said main shaft.

3. The apparatus of claim 2, wherein said structural means and said torsional means comprise tube and spring respectively, and wherein said tube is rotatably mounted on said main shaft, and said spring interconnects said main shaft and said tube.

4. A variable impedance device having a helical wound coil of electrically resistive material; a main shaft substantially coaxial with said coil, said main shaft having a portion coextensive with said coil; an electrically conductive trolley; cooperative supporting means of electrical insulating material between said main shaft and said coil, said supporting means being provided with bearing means for relative rotation between said coil and said main shaft; electrical terminal connective means for a coil end and for said take-off trolley respectively; and apparatus for maintaining substantially uniform trolley pressure on said coil throughout the range of trolley travel along the coil, comprising a structurally rigid tube rotatably mounted on said main shaft, torsion means interconnecting said main shaft and said tube, a trolley shaft extending through said coil, a trolley wheel rotatably and slidably mounted on said trolley shaft, dual links rigidly connected to said trolley shaft, said tube having a portion coextensive with said coil and having means for pivotally mounting said links at opposite tube ends, and arms rigidly mounted on said main shaft having radially extended slots for slidably receiving said trolley shaft.

5. The variable impedance device of claim 4, wherein said torsion means comprises a spring contained within said tube, said spring continuously exerting torsion force, and said spring having a substantially constant rate torque through a range of operation, and said spring being torsionally loaded to remain within said range of operation throughout the range of tube rotative movement encountered during operation.

References Cited in the file of this patent

UNITED STATES PATENTS

| | | |
|---|---|---|
| 1,552,095 | Tilton | Sept. 1, 1925 |
| 2,361,010 | Cary | Oct. 24, 1944 |
| 2,473,048 | Beckman | June 14, 1949 |
| 2,519,752 | Fox | Aug. 22, 1950 |